(12) United States Patent
Trama et al.

(10) Patent No.: US 8,955,128 B1
(45) Date of Patent: Feb. 10, 2015

(54) SYSTEMS AND METHODS FOR SELECTIVELY REGULATING NETWORK TRAFFIC

(76) Inventors: Francesco Trama, Pittsburgh, PA (US); Daniel Gynn, Allison Park, PA (US)

( * ) Notice: Subject to any disclaimer, the term of this patent is extended or adjusted under 35 U.S.C. 154(b) by 0 days.

(21) Appl. No.: 13/560,991

(22) Filed: Jul. 27, 2012

Related U.S. Application Data

(60) Provisional application No. 61/512,018, filed on Jul. 27, 2011.

(51) Int. Cl.
*G06F 21/00* (2013.01)

(52) U.S. Cl.
USPC .......................................................... 726/23

(58) Field of Classification Search
None
See application file for complete search history.

(56) References Cited

U.S. PATENT DOCUMENTS

| | | | |
|---|---|---|---|
| 6,167,428 A | 12/2000 | Ellis | |
| 6,341,309 B1 | 1/2002 | Vaid | |
| 6,442,588 B1 | 8/2002 | Clark | |
| 6,601,106 B1 * | 7/2003 | Moberg et al. | 709/238 |
| 6,751,738 B2 | 6/2004 | Wesinger, Jr. | |
| 6,823,383 B2 | 11/2004 | MacBride | |
| 6,839,852 B1 | 1/2005 | Pantuso | |
| 6,857,018 B2 | 2/2005 | Jiang | |
| 6,873,851 B2 | 3/2005 | Brown | |
| 6,880,089 B1 | 4/2005 | Bommareddy | |
| 6,892,235 B1 | 5/2005 | Daude | |
| 7,006,831 B2 | 2/2006 | Matz | |
| 7,016,980 B1 | 3/2006 | Mayer | |
| 7,174,566 B2 | 2/2007 | Yadav | |
| 7,194,464 B2 | 3/2007 | Kester | |
| 7,275,604 B1 | 10/2007 | Wall | |
| 7,284,267 B1 | 10/2007 | McArdle | |
| 7,299,296 B1 | 11/2007 | Lo | |
| 7,299,353 B2 | 11/2007 | Le Pennec | |
| 7,313,618 B2 | 12/2007 | Braemer | |
| 7,403,978 B2 | 7/2008 | Parekh | |
| 7,451,130 B2 | 11/2008 | Gupta | |
| 7,467,227 B1 | 12/2008 | Nguyen | |
| 7,633,869 B1 | 12/2009 | Morris | |
| 7,684,363 B2 | 3/2010 | Zhao | |
| 7,707,633 B2 | 4/2010 | Danford | |
| 7,748,040 B2 * | 6/2010 | Adelstein et al. | 726/25 |
| 7,773,569 B2 | 8/2010 | Belcea | |
| 7,779,458 B1 | 8/2010 | Heiderscheit | |
| 2002/0049899 A1 | 4/2002 | Kenworthy | |
| 2002/0126621 A1 * | 9/2002 | Johnson et al. | 370/230 |
| 2002/0157023 A1 * | 10/2002 | Callahan et al. | 713/201 |
| 2003/0041167 A1 | 2/2003 | French | |
| 2003/0081608 A1 * | 5/2003 | Barri et al. | 370/392 |
| 2003/0212901 A1 * | 11/2003 | Mishra et al. | 713/200 |
| 2003/0229810 A1 | 12/2003 | Bango | |
| 2005/0086299 A1 | 4/2005 | Ansell | |
| 2005/0191997 A1 | 9/2005 | Spearman | |
| 2005/0251582 A1 * | 11/2005 | Goel et al. | 709/238 |

(Continued)

OTHER PUBLICATIONS

"Valicating Incoming Data with the Strategy Design Pattern", Apr. 14, 2010, by AlenjandroGervasio, published on devshed.com.*

*Primary Examiner* — Dede Zecher
*Assistant Examiner* — Richard McCoy
(74) *Attorney, Agent, or Firm* — Ronald Law Group, LLC

(57) ABSTRACT

A system and method of regulating network traffic based on information about packets is disclosed. Network traffic from undesirable countries, companies, and regions, for example, can be blocked with the click of a mouse. The system employs an appliance, a server and a computer with a user interface from which it can be controlled.

15 Claims, 7 Drawing Sheets

(56) References Cited

U.S. PATENT DOCUMENTS

| | | |
|---|---|---|
| 2006/0230163 A1 | 10/2006 | Fish, III |
| 2007/0147380 A1 | 6/2007 | Ormazabal |
| 2007/0250930 A1* | 10/2007 | Aziz et al. .................. 726/24 |
| 2007/0253430 A1* | 11/2007 | Minami et al. ........... 370/395.52 |
| 2007/0300296 A1 | 12/2007 | Kudla |
| 2008/0022385 A1 | 1/2008 | Crowell |
| 2008/0069093 A1 | 3/2008 | Maestas |
| 2008/0092222 A1* | 4/2008 | Liu et al. .................. 726/11 |
| 2009/0201935 A1* | 8/2009 | Hass et al. ............. 370/395.32 |
| 2009/0265755 A1 | 10/2009 | Hamilton |
| 2010/0043067 A1 | 2/2010 | Varadhan |
| 2010/0138535 A1 | 6/2010 | Jerrim |
| 2010/0199343 A1 | 8/2010 | Verma |
| 2010/0268799 A1 | 10/2010 | Maestas |
| 2010/0313264 A1 | 12/2010 | Xie |
| 2010/0319065 A1 | 12/2010 | Hansson |

* cited by examiner

SYSTEMS AND METHODS FOR SELECTIVELY REGULATING NETWORK TRAFFIC

CROSS-REFERENCE TO RELATED APPLICATION

This patent application claims priority from U.S. Provisional Application Ser. No. 61/512,018, filed Jul. 27, 2011, the entire specification of which is incorporated by reference herein.

FIELD OF THE INVENTION

The invention relates to systems and methods for controlling traffic to a network. More particularly, the invention is directed to systems and methods for regulating network traffic based on user preferences.

BACKGROUND OF THE INVENTION

Many companies in business today do not have the need to receive traffic from other parts of the world. The traffic may be in the form of mail, FTP, SSH, or Telnet to name a few. There are over 65,000 different types of ports which network IP uses. For an administrator, managing ports plus the billions of IP addresses (soon to be trillions +) is a job in itself. Administrators typically use firewalls to mitigate the impact to their fragile infrastructure by regulating or allowing only certain types of traffic to their network. The problem becomes when the company has to allow public ports to fulfill basic Internet communication such as mail, ftp, vpn, or web to name a few. In this situation, the administrator may then have to place additional protections to each of these public services to protect themselves from those who wish to take advantage of vulnerabilities within those public network services.

For example, for regulating electronic mail, a company may use additional SPAM filtering to reduce the amounts of SPAM and malware entering the mail system. For this, the SPAM filter uses several different methods and algorithms for filtering mail based on criteria determined by an administrator. However, even SPAM filters are limited by the types of criteria or restrictions for filtering, such as IP Address, range, reverse DNS, intent, or content filtering. And while these SPAM filters reduce the amount of SPAM to a company's mail system, the filters do not prevent a spammer from sending the original message which in turn requires the company to still allow the traffic, then process it, and finally drop the message. In fact, the spammer could keep trying such that a few messages could infiltrate until the system or administrator "catches" their SPAM.

Thus, when SPAM or undesired traffic is found on a company's system, the administrator has the following options: determine where the IP originates and block the single address; block the Class C range, or find what Classless Inter-Domain Routing (CIDR) it belongs to and block it within an access list. However, one problem with these options is that many dubious internet users access the internet within areas of the world which do not regulate their IP addresses. These users can thus easily use these IP addresses to SPAM, hack, and publish malware to the rest of the world. Because of the challenge of regulating IP addresses in the world, the ill intent users are able to easily move from IP address to IP address within a country's assigned IP network range.

Currently, network filtering appliances allow for blocking by single, ranged, or subnetted network addresses. Although this can be currently done, there is no way to block a country's complete assigned network ranges which have been assigned by the Internet Name and Number Authority (IRNA).

IRNA assigns groups of IP addresses using Classless Inter-Domain Routing (CIDR) groups to countries, which in turn filters IP addresses to areas within their countries. For example, Serbia has the following range assigned:
Network: 109.92.0.0
CIDR: 109.92.0.0/15
Mask: 109.92.0.0/255.254.0.0
Network Range: 109.92.0.0-109.93.255.255
Total addresses: 131,072
Registrar: RIPENCC This indicates that Serbian Internet providers may use a network range of 109.92.0.0-109.93.255.255, which is a total of 131,072 addresses. If an administrator wanted to block this range they would have to perform an entry to the firewall to block 109.92.0.0/15. Unfortunately, Serbia has 180+ different assigned ranges. This would force the administrator to enter each 180+ address ranges within their firewall system. Serbia however, is considered one of the smaller CIDR assignment ranges compared to other countries such as Russia which has over 4,400 CIDR assignments, or even China which has more than 3,400 or 331,826,000+ network addresses. Thus, an administrator would have to enter almost 8,000 block entries within his or her firewall to prevent those countries from, for example, sending mail or accessing other public Internet services should the company decide they have no need to receive traffic from a designated country or region.

Further complicating matters, with over 200+ countries and 4.3 billion addresses, the addresses have been assigned non sequentially. When the IP assignments came about, IP ranges were assigned as needed throughout the world and therefore not sequentially in order. This meant that different countries came online at different times, which in the end turned into a non sequential assignment of IP ranges for a particular country. Thus, for example, a country could be assigned: 1.1.1.1 to 2.2.2.2 and also be assigned 20.20.20.20 to 23.22.22.0. Because of the randomness in IP assignment, administrators do not have the ability to block a country's IP network traffic sequentially and therefore administrators have to enter separate CIDR addresses for each country.

Accordingly, there is a need for systems which allow companies to control or regulate traffic, for example, when they do not have the need to receive a particular country's or region's traffic, have limited bandwidth, or only want to provide services to a region near their business. Such systems and methods should allow for securely collecting IP addresses from around the world and the ability to selectively control or regulate traffic from a desired and/or undesired region.

SUMMARY OF THE INVENTION

An aspect of the present invention is to provide a method for reducing unwanted network traffic via easily configured lists and other malicious network traffic abatement measures based on a country's assigned network IP ranges. The system may build master/access control lists based on user preferences for countries or national boundaries that they choose not to receive traffic from based on preassigned network ranges from Internet name and Number authorities.

BRIEF DESCRIPTION OF THE DRAWINGS

For a fuller understanding of the nature and advantages of the present invention, reference should be made to the following detailed description, taken in connection with the accompanying drawings, in which.

DETAILED DESCRIPTION OF THE DRAWINGS

An aspect of the invention is generally directed to systems and methods for regulating network traffic. As described further herein, an aspect of the invention is directed to regulating network traffic based on user preferences, such as geographic location.

Figure 1:
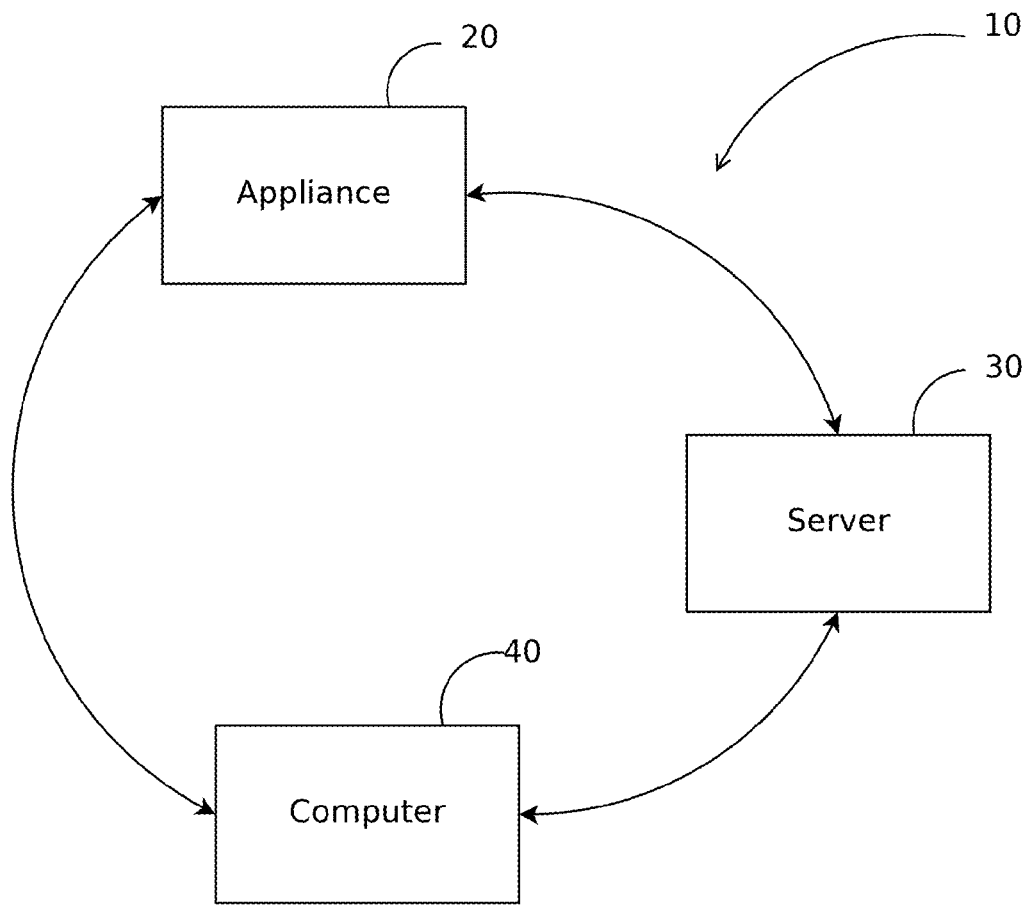
FIG. 1 illustrates a system in accordance with an embodiment of the invention

An exemplary system 10 includes at least an appliance 20, a server 30, and a computer 40 as illustrated in FIG. 1. The appliance 20 may be a hardware appliance or may be a virtual appliance. A hardware appliance includes a physical box, such as typical server hardware from Dell, HP, IBM, and other hardware providers, that may be racked and set in secure areas as appreciated by one skilled in the art. The hardware appliance may have software programmed thereon. The user may configure the hardware and his or her router to their desired preferences as discussed below to allow real-time regulation of network traffic, such as blocking or dropping traffic, rerouting traffic, logging traffic, and the like, to occur. In embodiments, the hardware appliance may be updated periodically, such as daily, monthly, or annually from server 30. A virtual appliance includes, for example, an appliance that may be located on a virtual server such as that provided by VMware® and the like as appreciated by one skilled in the art.

The appliance 20 includes at least one processor. The at least one processor may be any machine that receives and processes information as appreciated by one skilled in the art. A rules engine, such as will be more fully described in relation to FIG. 2, is programmed to be run by the processor and may have programmed thereon predefined rules to evaluate incoming information based on one or more predefined rules. In embodiments, the rules engine may include a predefined set of rules determined by a user's preferences. The processor may also include a script generator that collects, organizes and compiles files and the like such as text files as discussed further herein.

The server 30 may be a single central server or in alternate embodiments may include one or more servers in communication with each other as appreciated by one skilled in the art. As used herein, the terms "server" and "centralized server" are used interchangeably. In an embodiment, a centralized server may include a repository or database for updates and content information for the appliance and/or user. For example, the centralized server may store lists of IP addresses by region, store additional details about the IP addresses, such as host name, location information and the like, include associated information from 'whois', as well as include a storing place for receiving system updates and the like as appreciated by one skilled in the art. The repositories on the server may be updated daily or as frequently as desired by querying the Internet Name and Number regulatory authorities daily or when newly discovered IP addresses are discovered.

The computer 40 provides a user interface for the system. The user interface may be a web browser that allows the user to interact with the system. The at least one appliance, server, and computer may be in operable communication with each other or with other appliances, servers and/or computers in any manner such as through a network as appreciated by one skilled in the art.

Packet Evaluation Order and Filter Statement Load Speed Enhancements

In an aspect of the invention, the appliance 20 further includes repositories, such as databases. For example, the appliance stores the world's IPV4 and IPV6 assigned IP addresses within one or more repositories. The one or more repositories organize the IP addresses in files such as text files, lists or the like. As used herein, the terms 'file' and 'list' will be used interchangeably. The file may associate each IP address, range and or Classless Inter-Domain Routing (CIDR) range and details of who the range is assigned to with the at least one repository.

In an embodiment, the repository may be organized and or compiled into any one or more of the following lists: Prebuilt Country IP lists, Subscribed Lists, Custom Lists, or Control Lists. The Prebuilt Country IP Lists may be a pre-made list for each country. These files/lists may be updated from the centralized server 30 as information is obtained from the appliance 20. Subscribed Lists may include prebuilt lists which a user may choose to add or filter with. These lists may be compiled from a single appliance or a network of appliances and then assorted by registries. The user may select the desired lists through the user interface on the computer 40. Custom Lists are lists that the user can create based on their own criteria or information for example, such as a list of known bad IP addresses within countries. Control Lists include lists where, for example, the user sets thresholds to rate control such as to control or regulate traffic flow through the system. Other lists which are not based on geographical boundaries may also be utilized.

The desired lists or text files may be selected or turned on by the user through the user interface on the computer for processing. The selected text files are then collected and/or organized by, for example, the script generator as appreciated by one skilled in the art. The script generator generates a script or 'master access' file of the selected lists and loads it in the memory (RAM) of the appliance 20. In embodiments, the appliance can be located at any number of locations so long as it sits in between the Internet and the network it is designed to protect. The most common configuration would be a "Layer 2 network bridge" that would sit "in front" of a user's networking equipment and filter traffic in a way that would be invisible to the user.

In operation, when network traffic, such as individual packets, attempt to enter a network protected by the system of the invention, rules are applied, they are loaded into the network filter of the system in various chains as appreciated by one skilled in the art. As used herein, a "chain" refers to a series of rules that are applied to the incoming packets such that they can be handled in a pre-defined and automated way depending on whether or not they satisfy certain criteria or have certain characteristics. In one embodiment, chains are created in the following order: HONEYPOT-DROP, CUSTOM, TRIGGER, LIST, and OUT-LIST. A description of these chains follows.

Figure 2A:
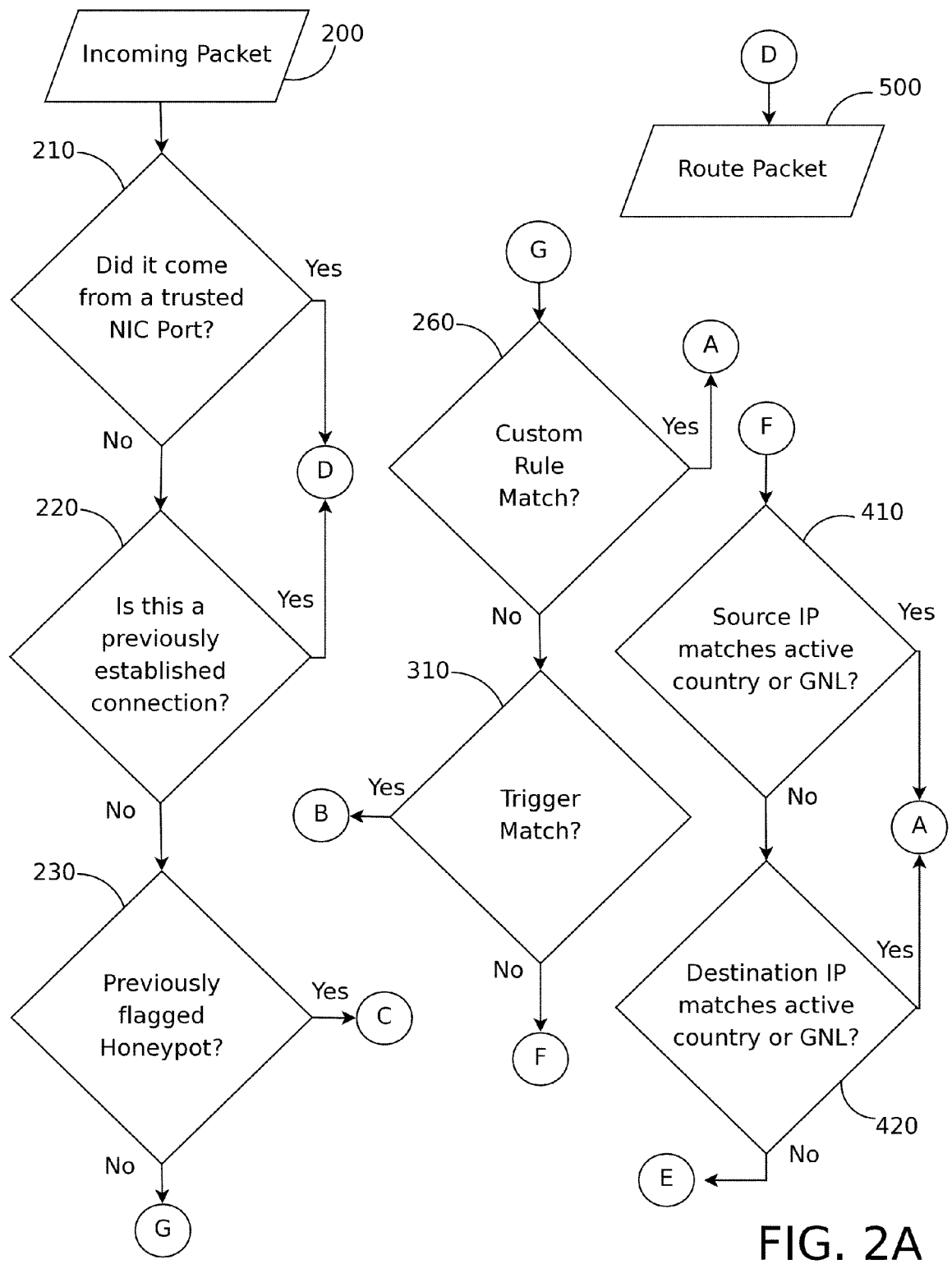
FIGS. 2A-2C illustrate a packet evaluation filtering system in accordance with an embodiment of the invention.
Figure 2B:
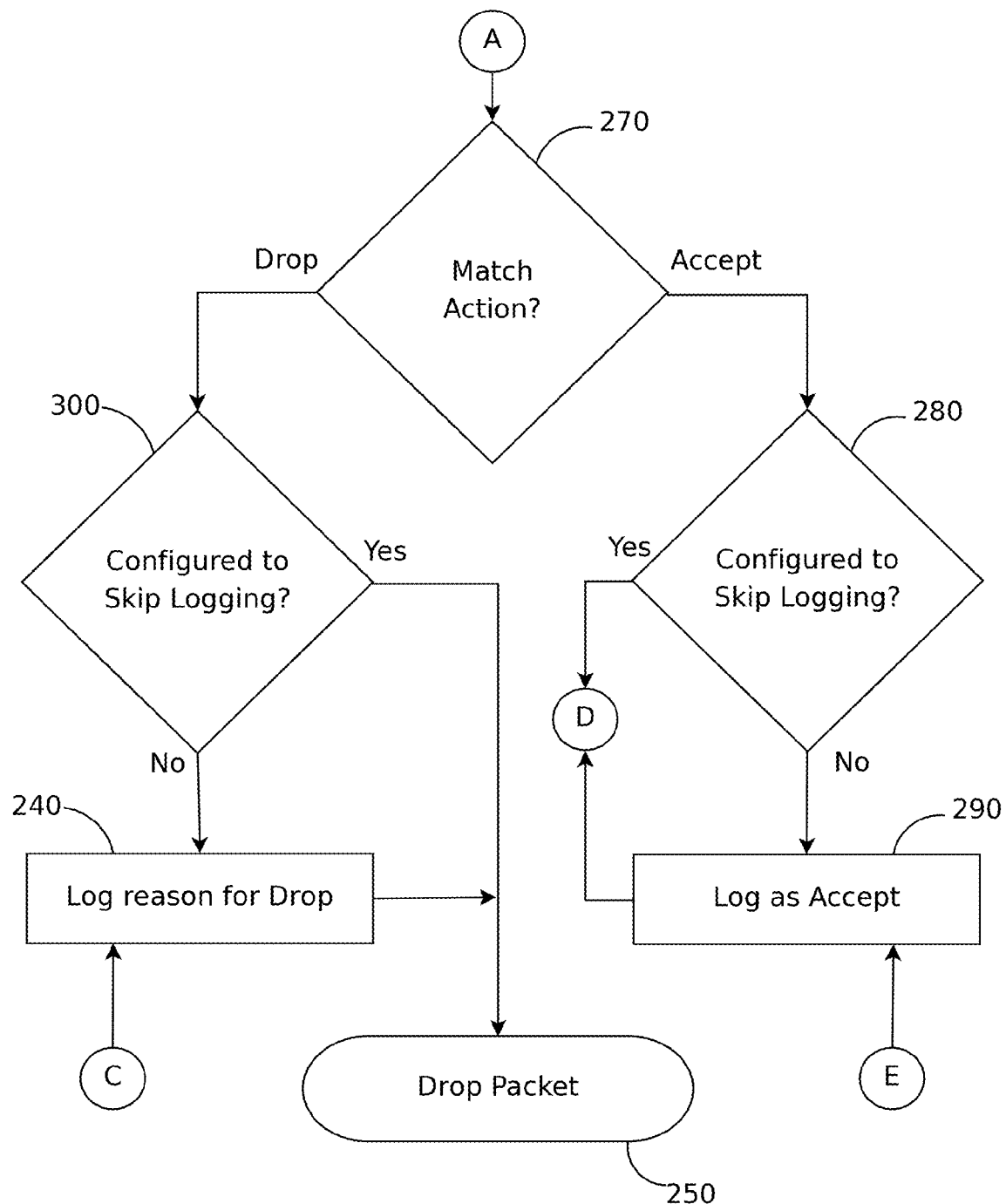
Figure 2C:
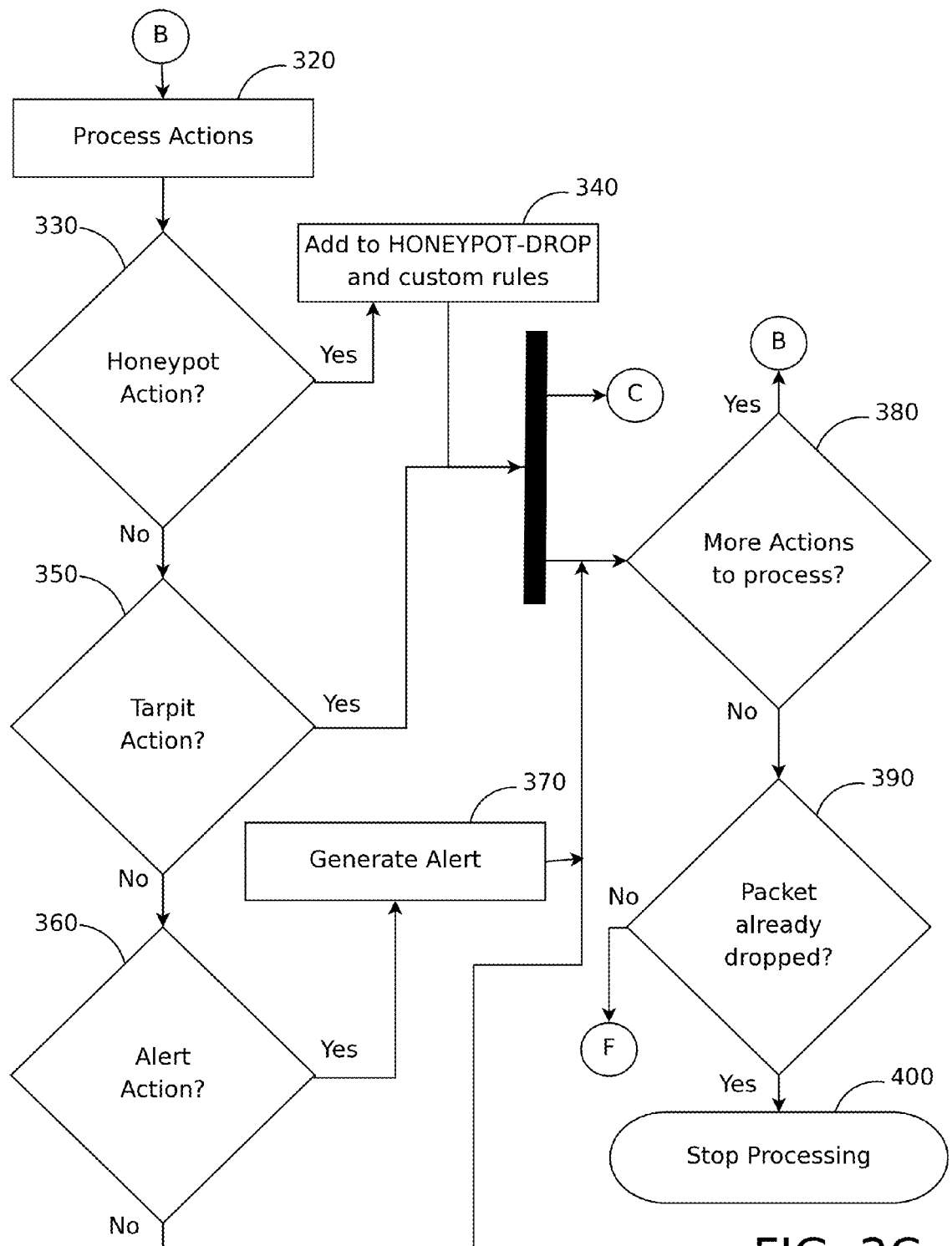

With reference to FIGS. 2A-2C, in an embodiment, when traffic or an incoming packet arrives 200 at the appliance, it is compared 210 to a list of trusted ports. The packet is accepted 500 without logging and no further evaluation is performed if it came in on a trusted port. Also, if the packet is associated 220 with a previously established connection, it is also accepted 500 without logging and with no further evaluation.

If the packet fails the first two rules, the HONEYPOT-DROP chain is evaluated 230. The HONEYPOT-DROP chain is initially empty when loaded into the network filter. This chain is populated via triggers that have a blacklist/honeypot action. When a trigger's criteria matches a packet and the action is blacklist/honeypot, an entry blocking the packet's source IP is added to the HONEYPOT-DROP chain and a new custom rule is added to the database and file on the Appliance. When a packet enters the Honeypot step, the packet's destination IP address is compared against a list of IP addresses in the honeypot, which is, for example a predefined and/or pre-configured list determined by the user. For example, the user may configure IP addresses that should never receive legitimate network traffic for the honeypot. These settlings can be stored in a database on the Appliance as discussed above. If a packet's destination IP address matches an IP address in the honeypot, then the packet information is logged, the packet is dropped and the packet's source IP address is flagged. Future connections from the same source IP address will immediately be dropped in the future by the Honeypot-Drop step. With reference to FIG. 2, therefore, if the packet matches a statement in the HONEYPOT-DROP chain, the details are logged 240, the packet is dropped 250, and no further evaluation is performed.

If the packet was not previously flagged in the HONEYPOT-DROP chain, the CUSTOM chain is evaluated 260. The CUSTOM Chain is populated by the custom rules configured by the user. The rules are ordered by the rule priority. If two rules have the same priority, the rules are ordered in the order that they were created. The user may create an unlimited number of custom rules. Each custom rule can be created to filter traffic based on one or more criteria such as source IP address or network range, destination IP address or network range, protocol, port, or other criteria as appreciated by one skilled in the art. Each custom rule will be set to Accept or Block network traffic. Additionally, each rule is assigned a priority. These settings are stored in a database on the Appliance. After each save, the complete list of custom rules is written to a file in a format that allows the rules to be quickly loaded into the system's network filtering utility.

Still referring to FIGS. 2A-2C, as a result of the match action 270, an accepted packet is checked 280 against the custom rules and either logged 290 first and then routed 500 or simply just routed 500. Likewise, a rejected packet is evaluated 300 against the rules in the custom chain and either logged first 240 and then dropped or simply dropped 250 without logging.

If the incoming packet is not matched 260 by the CUSTOM chain, it is evaluated 310 against the TRIGGER chain. The TRIGGER chain is populated by the triggers configured by the user. Thus, if the packet matches a statement in the TRIGGER chain, the associated action is performed 320 and/or information is stored in the database to perform the action. If one of the actions was blacklist/honeypot 330, the packet details added to the HONEYPOT-DROP chain 340 are logged 240, the packet is dropped 250. If the action is to rate limit/tarpit 350, the packet details are logged 240, the packet is dropped 250. Additionally, if the packet data matches 360 an alert action, an alert is generated 370. All triggers are evaluated 380 before any actions are performed. If it is determined 390 that the packet was dropped, processing is stopped 400. Otherwise the next chain is evaluated.

The triggers are performed in the order that they were configured. All triggers that match the packet will be executed. The user may also create an unlimited number of triggers. Each trigger can be created to perform an action based on one or more criteria such as source IP address or network range, destination IP address or network range, protocol, port, or other criteria as appreciated by one skilled in the art. Each trigger can be configured to only match on a specific rate of traffic. Additionally, each trigger can have one or more associated actions, such as blacklisting (honeypotting) the source IP, rate limiting (tarpitting) the source IP, or sending alerts. These settings are stored in a database on the Appliance. After each save, the complete list of triggers is written to a file in a format that allows the triggers to be quickly loaded into the system's network filtering utility. A script runs periodically to handle the trigger actions that were logged to the database. If there was a blacklist/honeypot action associated with a trigger match, the script adds a statement to the HONEYPOT-DROP Chain and the source IP is added to the custom rules list in the database. If there is a email, SMS message, or other such alert action associated with a trigger match, the script generates the appropriate message, including details about the trigger match, and sends the alert according to the action configuration.

If the packet has not been dropped, it is next evaluated 410 by the LIST chain. The LIST chain is initially populated with 256 sub-chains. There is one chain created for each number that can be represented in the first octet of an IPv4 network address. The evaluation will follow the chain associated with the packet's source IP's first octet number. Each sub-chain is populated by pre-compiled lists downloaded from the central server based on the countries and global network lists the user has chosen to use. The user may select, via the user interface, those countries and global network lists that they wish to block. Additionally, each country or global network list can be configured to match or not match specific TCP ports. The LISTS chain compares 410 the incoming packet's source IP address with IP addresses and network ranges have been defined in various designated "lists" within the system. If it doesn't match, the packet information is either logged 290 first and then routed 500 or simply just routed 500 depending on how it is configured by the user. Likewise, a matched packet to be dropped is evaluated 300 and either logged first 240 and then dropped or simply dropped 250 without logging depending, again, on the configuration.

Next, the OUT-LIST chain is evaluated 420. As with the LIST chain, the OUT-LIST chain is initially populated with 256 sub-chains. There is one chain created for each number that can be represented in the first octet of an IPv4 network address. The evaluation will follow the chain associated with the packet's destination IP's first octet number. Each sub-chain is populated by the pre-compiled lists downloaded from the central server based on the countries and global network lists the user has chosen to use. The corresponding sub-chain is then evaluated based on the first octet of the packet's destination IP address. If the packet matches a statement in the sub-chain, the packet details are logged, the packet is accepted or dropped based on the list definition, and no further evaluation is performed.

In embodiments, the LIST and OUT-LIST chains incorporate Country Lists and Global Network Lists, sometimes referred to as GNL's, which are comprehensive lists of network IP ranges allocated to businesses that a user of the appliance may wish to allow or block based on the reputation of the business. GNL's give the user of the appliance more granular control by allowing them to block traffic originating from a specific business's IP address pool even if that IP address is in a country the user allows traffic from. To accomplish this, as is known in the art, the central server can generate pre-compiled, optimized load files and database update scripts which can be automatically downloaded by the appliance. The load files are then used by the script generator to implement the GNL. The database update scripts keep the appliance's information about the Country and GNL lists up to date. Information about each GNL includes a description, threat rating, number of network ranges, business type, and other information. Optionally, GNL's can be updated from various sources on the central server including public repositories, other appliances, and honeypots.

If the packet is not matched by any of the above chains, the packet details are logged 290 and the packet is accepted 500.

While the above-described processing and order of steps have been described, such steps and sequence is not intended to be limiting in any manner and can include additional processing steps as well as a different sequential order, which will apparent to those of skill in the art.

A typical configuration of an embodiment of the invention may have 300,000 or more individual filter statements. The typical method to load a statement, as appreciated by one skilled in the art, would be to load each statement individually. On typical hardware, this method would take several minutes to complete. This present invention creates the individual statement types (custom rules, triggers, countries and global network lists) as network filter load script files as suitable by the iptables-restore utility. The iptables-restore utility is familiar to those skilled in the art. The network filter load script further combines these individual files into one large load file that can be executed all at one time and then sends the load file to the iptables-restore utility. This drastically reduces the load time down to several seconds. It also reduces the amount of time that a specific filter statement may be inactive within the network filter.

Additionally, the individual statement files for the country and global network lists are created on the central server and downloaded onto the Appliance, so that the Appliance is not required to create these files. These pre-compiled country and global network lists are optimized to reduce the number of statements by combining adjacent networks.

In aspects of the invention, the appliance may further include a relational database or the like. The relational database may record, store and/or monitor the network activity and/or data relating to the processed network traffic. For example the relational database may log and store the processing steps via the rules engine. The recorded network activity may then be used for the user's information and analysis, such as analyzing the data to identify new traffic filtering criteria.

In yet other aspects of the invention, the relational database may be in communication with the centralized server 30. For example, the network activity obtained by the relational database may be communicated to and/or stored on the centralized server. In embodiments, the centralized server may store the updated activity from the relational database of a single appliance or a network of appliances thereon. For example, the centralized servers may then catalog, sort, and store the newly discovered IP address from the relational database for inclusion in predefined lists to be later downloaded from the centralized server to the appliance for use.

In embodiments, the system may include a single appliance, centralized server and computer in communication with each other. In other aspects, the system may include multiple appliances in communication with a single centralized server or alternatively may include a network of appliances in communication with a network or centralized servers. In aspects of the invention, the system may be self learning. For example, the system can provide updates through one or more centralized servers to one or more appliances relating to information from a relational database such as the received traffic trends and updated sourced IP addresses. Based on such traffic trends, for example, a user may create new processing parameters for filtering the network traffic. The centralized servers may even schedule routine update to send to each corresponding system such information so they update data from all other systems reporting.

In an aspect of the invention, a user may be able to prevent network traffic such as electronic mail (in this instance, the packet) from desired regions, from a list of countries, regions, islands, provinces, or states from which to block or allow traffic. The user may select on a web browser on the computer at least one desired region of interest and the desired network traffic to regulate, such as electronic mail. Once selected, the system may then build a 'master list' or 'master access list' via a script generator based on the selected country's assigned network range. The system may then initiate filtering traffic based on the created 'master list' by processing the network traffic via the processor including the rules engine. Upon receiving a packet, the system checks the master list, the honeypot lists, the whitelist, the tarpit list and any other desired lists, such as a custom list. Based on the processing of the network traffic, the system may then allow or drop the incoming traffic. The system may then catalog all logged IP addresses and look up their respective registered information with the Internet name and number authorities and update the repositories organized into their country, region, providence, island, state, or company, or the like on the centralized server pursuant to a desired schedule.

As discussed above the user accesses and/or interacts with the systems via a web based interface. This interaction may be initiated by a log-in procedure as appreciated by one skilled in the art, through which the user will be provided a list of countries, regions, provinces, states and companies to potentially block, for example. In other embodiments, the user may be presented with a graphical presentation of geographic regions for his or her selection.

Figure 3:
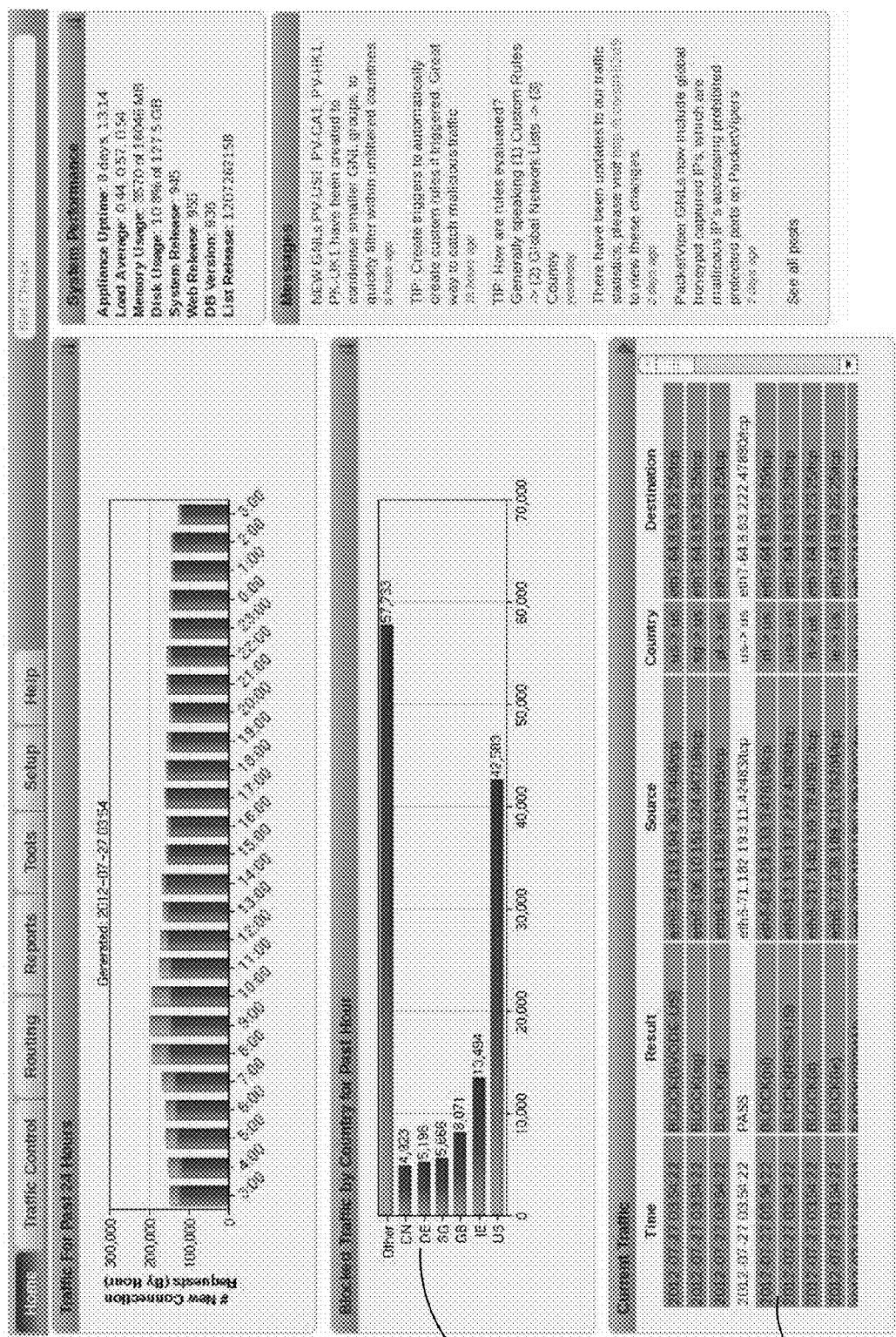
FIG. 3 is a sample user interface in accordance with an embodiment of the invention.

Referring to FIG. 3, a user interface 510 may also display real-time statistics which illustrate, for example, a partial or complete detail of the real time logs 515, top countries accessing the users network, top ten IP addresses which accessed their system, hourly statistics on blocked countries 520, and the like. The user may customize the web page to its desired viewing preferences such as the desired viewing parameters on the home page and/or the time intervals of the live reporting graphs. The home page may also display the current Internet network threat level obtained from publicly provided organizations on the internet and/or other systems. The system may also display an alert message area which shows latest alerts and notifications from either the user's setting or from the centralized updating servers.

Clickable Real-Time Logs

Figure 4:
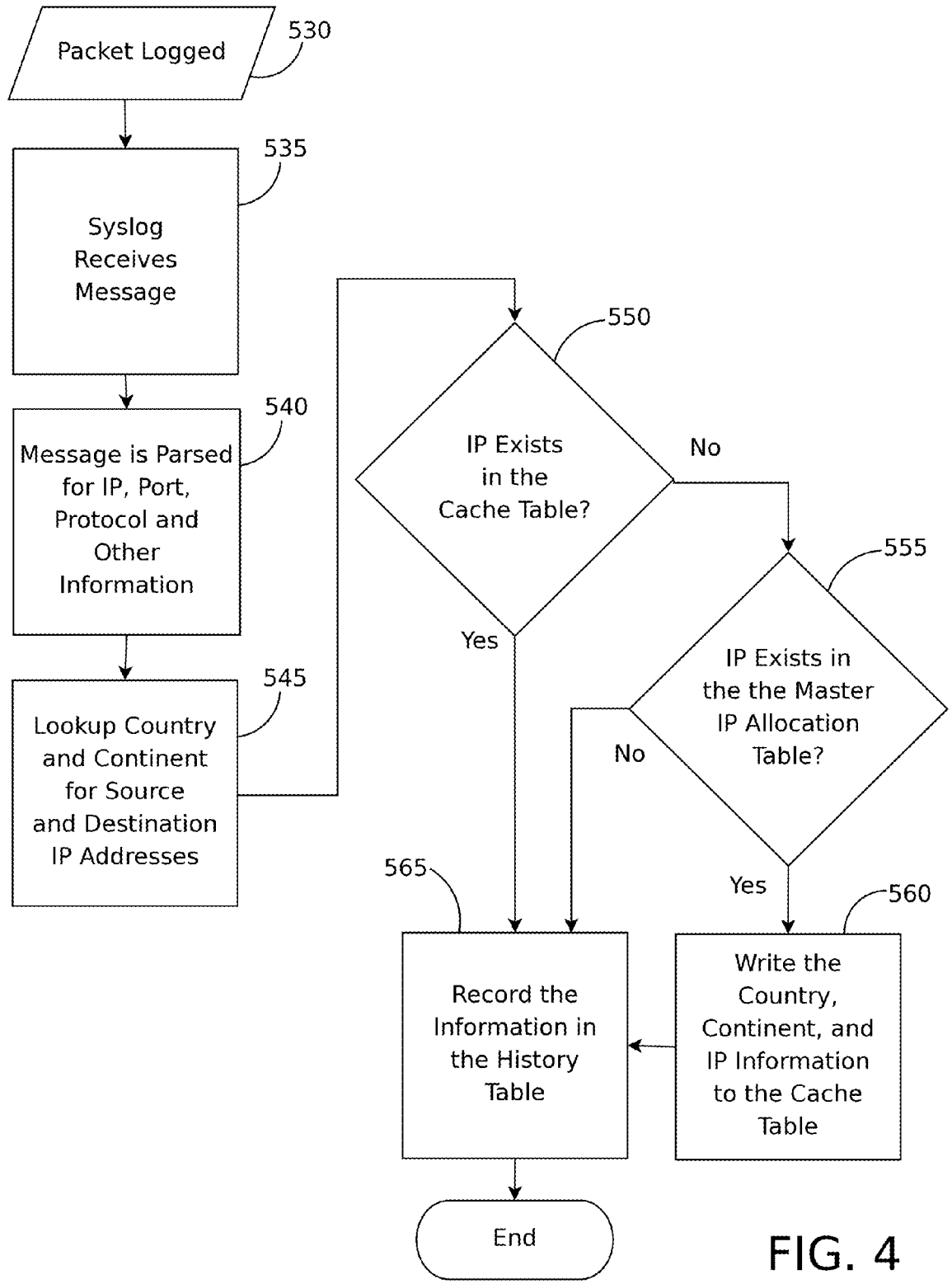
FIG. 4 demonstrates a method of identifying IP addresses of logged packets.

Referring, now, to FIG. 4, for each packet that is logged 530 to the database 535 by the network filter of the appliance described in the packet evaluation algorithm described in FIGS. 2A-2C, an additional process can be launched that attaches additional information based on the packet details and inserts a record into a history table. This process parses 540 the string that represents the packet header information such as source IP, destination IP, protocol, port, and other values. Whether the packet was allowed to pass or blocked (and the blocking reason) are also parsed. Then, the country and continent assigned to the source and destination IPs are retrieved 545 from other database tables.

To retrieve the assigned country and continent, a query 550 is first made to a lookup cache table. Preferably, this cache table resides entirely in memory (RAM, for example) and is used to speed the lookup process. The cache table contains the most recent IP to country allocations that have been found. If the IP is not found in the cache table, the process then queries 555 the master IP allocation table that resides on disk in a more permanent memory format. This master table is automatically updated from the central servers to contain an up-to-date IP to country map. The result from the master table is then added 560 to the cache table. Periodically, the cache table is purged of the oldest records so that the table size does not exceed available system memory. Once this process is complete, the resulting information is recorded 565 in the History table for later use.

In embodiments, the user interface contains a real-time display of the logs in the history table. This real-time display is updated every second and shows information about the packets traversing the system including the time, source and destination IPs, source and destination ports, protocol, and source and destination country.

Figure 5:
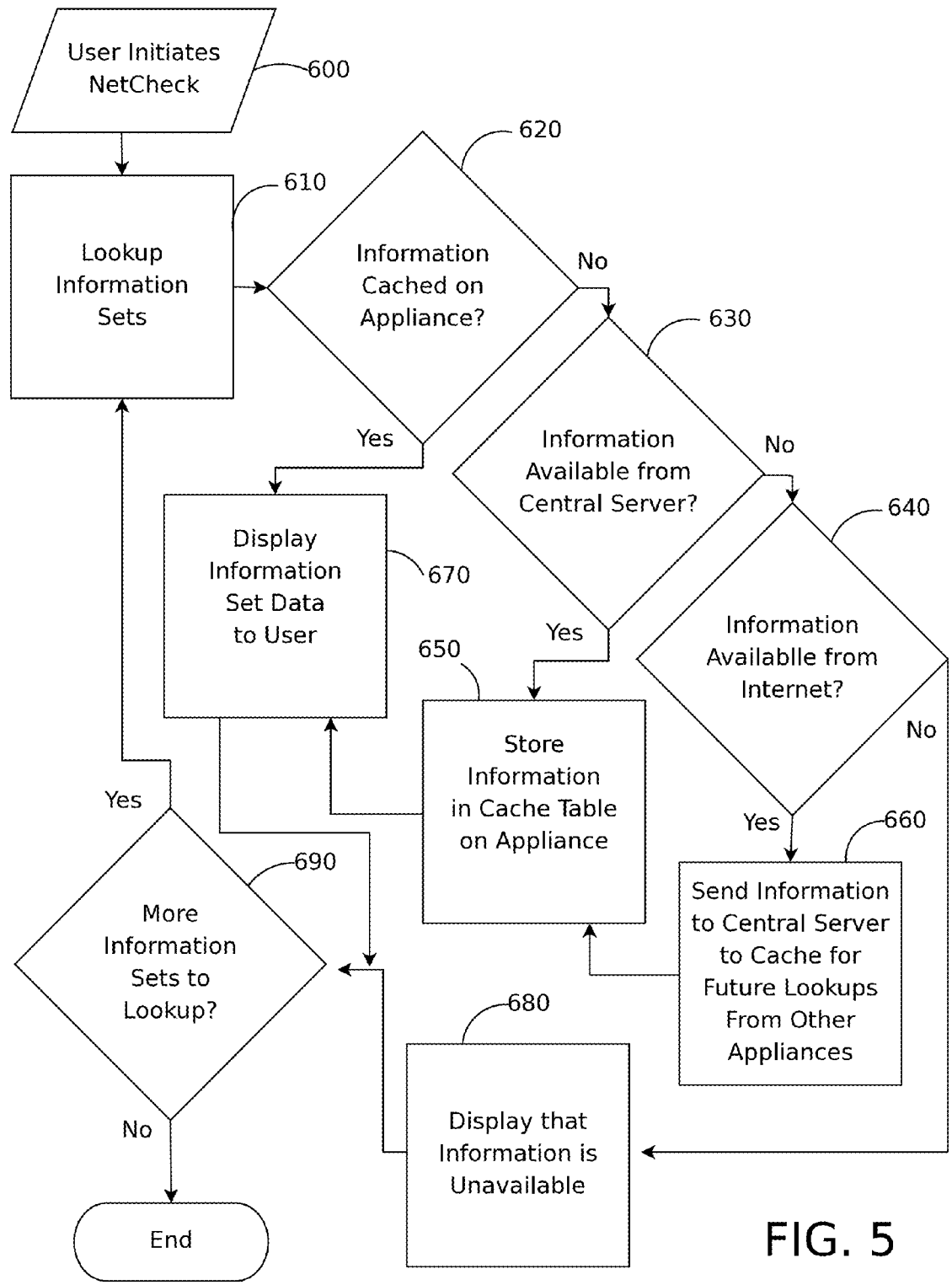
FIG. 5 demonstrates a user-initiated Net Check in accordance with an embodiment of the invention.

Referring, now, to FIG. 5, the user may also select 600 an IP address displayed within the real-time logs to perform a "NetCheck". A NetCheck provides the user with additional information 610 about the IP that was clicked. Additionally, a user may manually enter an IP address or host-name to generate a NetCheck. The "information sets" returned to the user include the number of times it has accessed the appliance, IP location information including country and region, reverse DNS host and domain name, DNS information for the IP's domain name, WHOIS information, and whether the IP address matches any custom rules, triggers, or lists.

The process to generate the NetCheck details involves querying 620 the appliance's database as well as sending a request for information from the central servers 630. For the IP location information, reverse DNS host and domain name, and WHOIS information, the process first queries local tables on the appliance 620. For each of these distinct information sets, if no information is found in these local tables, a request is sent to the central server to get the information 630. If no information is returned from the central server, then the appliance queries 640 public repositories on the Internet for the information. When the information is retrieved, whether from the central server or the Internet, the information is stored 650 in the local tables for quicker retrieval the next time the same query is performed. If the information was unavailable from the central server, the information retrieved from the Internet is sent 660 to the central server for quicker retrieval from other appliances. Both the central server and the appliance periodically purge old data so that obsolete data isn't returned to a user. The user then presented 670 with the relevant information and may then select to block the IP address, range or country by selecting any of the information presented in the search results. Once selected and/or applied, the system updates the current master lists. Of course, in the event that no information was obtained, a message to that effect is presented 680 to the user. If necessary, the process is then repeated 690.

The web interface may also be configured to present a world map to a user. The world map may dynamically illustrate the current origination of the traffic accessing their system. The user may be able to select the country from the map and block its traffic instantaneously. The user may also be able to set thresholds within the system so that in the event a particular threshold is breached based on the country, its regions, providences, island, state or companies, the system automatically limits the network traffic based on the user's criteria. The thresholds which can be determined as desired can be based on how many times an IP address accesses their network over a given period of time, country origination, and/or port.

The user may also be able to access historical records which show network traffic access and patterns based on the IP address, range, or CIDR assigned to a country, its regions, provinces, island, state, or companies of origination. The historical reports may have indicators, such as check marks and may be selectable so as to allow the user to choose to block or allow further traffic.

Another embodiment of the invention includes web filtering which allows a user to use the appliance or a hosted solution to filter outbound web traffic based on, for example, geographic restrictions. For example, the outbound web traffic may be filtered based on common filtering methods based on websites such as gambling, pornography, narcotics, and the like, but also allow for blocking of the outbound traffic to certain geographic regions such as China or Russia.

An aspect of the invention is directed to a method of regulating network traffic including creating a repository, i.e. a master list, of desired regions to regulate network traffic to or from and processing or analyzing an incoming packet via a rules engine and the master list.

Although the present invention has been described in considerable detail with reference to certain preferred embodiments thereof, other versions are possible. Therefore, the spirit and scope of the invention will not be limited to the description and the preferred versions contained within this specification.

What is claimed is:

1. A system for selectively regulating traffic into and out of a network in real time without compromising the speed of the traffic by protecting the network from unwanted traffic, using IP header information contained in the traffic, the system comprising:
a computer for providing an interface to a user;
a server in operable communication with the computer for storing network information associated with the network traffic, wherein the server comprises a repository for updates, pre-compiled lists of IP header information correlated to specific countries, regions and on-line entities, and content information from the user; and
an appliance comprising programmable hardware or virtual hardware, in operable communication with the server, for evaluating and regulating incoming packets to the network and outgoing packets from the network consistently with the network information;
the appliance further comprising at least one processor for executing a rules engine, the rules engine applying a plurality of user-configured decision chains to the packets in a predetermined order, the user-configured decision chains including at least three of a trusted chain, a honeypot-drop chain, a custom chain, a trigger chain, a list chain and an out-list chain; wherein the trusted chain allows traffic to pass if it is from a previously established network connection or is from a trusted physical network port; the rules engine further configured to execute the included decision chains in the following order: trusted chain, honeypot-drop chain, custom chain, trigger chain, list chain and out-list chain, until a packet is either routed or dropped based on one of the included decision chains, whereby the flow of incoming and outgoing packets is controlled according to a set of rules defined by the user,
the appliance further comprising a script generator for organizing and compiling files, a database for storing logs, user configurations and cached data,
whereby the number of chains applied to the packets is minimized.

2. The system of claim 1, wherein the honeypot-drop chain is initially empty and stores source IP address information on packets that match user-configured criteria in the trigger chain that have a honeypot action, the rules engine being configured to compare the source IP address of the packets with the IP address information stored in the honeypot drop chain, the rules engine further issues commands to drop the packets if the source IP address of the packets matches the IP addresses in the honeypot-drop chain.

3. The system of claim 1, wherein the custom chain stores user-configured rules consisting of information found in an IP packet header comprising one or a plurality of source IP address, destination IP address, protocol, physical source network port, physical destination network port, and protocol specific flags, as well as countries, regions, or online entities that are deduced from the header information by the rules engine using pre-compiled lists retrieved from the server, the rules engine issues commands to accept or drop the packet if the packet matches the user-configured rule.

4. The system of claim 1, wherein the trigger chain stores user-configured trigger rules based on a match with IP header information comprising one or more of source IP address, destination IP address, protocol, physical source network port, physical destination network port, and protocol specific flags, as well as countries, regions or online entities that are deduced from the header information by the rules engine using pre-compiled lists retrieved from the server, and a traffic flow rate limitation, the user-configured rules having at least one associated action, wherein the at least one associated action comprises one or more of adding the source IP address to the honeypot-drop chain, dropping packets, and sending alerts to the user.

5. The system of claim 4, wherein the rules engine issues commands to the processor to execute the at least one associated action if the IP header information matches a user-configured rule.

6. The system of claim 1, wherein the list chain stores user-configured rules to accept or drop packets based on the source country, region, or online entity that is deduced from the header information by the rules engine using pre-compiled lists retrieved from the server, the user-configured rules can further specify additional packet header information such as TCP or UDP ports, wherein the rules engine compares the source IP address and destination port of the packet with IP addresses in the list chain and accepts or drops the packets, as defined by the user, if the IP address matches an address in the list chain.

7. The system of claim 1, wherein the out-list chain stores user-configured rules to accept or drop packets based on the destination country, region, or online entity that is deduced from the header information by the rules engine using pre-compiled lists retrieved from the server, wherein the user-configured rules can further specify additional packet header information comprising TCP or UDP ports, wherein the rules engine compares the destination IP address and destination port of the packet with IP addresses in the out-list chain and, in the case of a match, accepts or drops the packets depending on the rules.

8. A method for selectively regulating traffic into and out of a network without compromising the speed of the traffic, based on an evaluation of IP header information, including geographic, company, or other online entity information deduced from the IP header information of the packets, comprising:

receiving an incoming packet to the network having header information comprising at least a source IP address and a destination IP address;

evaluating the incoming packet with a trusted chain, wherein the packet is routed if the packet is from a previously established connection or a trusted physical network port;

then, if the packet was not routed or dropped, evaluating the incoming packet with a honeypot-drop chain, wherein the honeypot-drop chain stores source IP address information from packets that match user-configured criteria, the packet is dropped if the source IP address of the packet matches an IP address in the honeypot-drop chain;

then, if the packet was not routed or dropped, evaluating the incoming packet with a custom chain, wherein the packet is evaluated with user-configured rules, consisting of information found in an IP packet header comprising one or a plurality of source IP address, destination IP address, protocol, physical source network port, physical destination network port, and protocol specific flags, as well as countries, regions, or online entities that are deduced from the header information by the rules engine using pre-compiled lists retrieved from the server, wherein the packet is either dropped or routed depending on the application of the at least one rule;

then, if the packet was not routed or dropped, evaluating the incoming packet with a trigger chain, wherein the packet is evaluated with user-configured trigger rules based on a match with IP header information comprising one or more of source IP address, destination IP address, protocol, physical source network port, physical destination network port, and protocol specific flags, as well as countries, regions, or online entities that are deduced from the header information by the rules engine using pre-compiled lists retrieved from the server, and a traffic flow rate limitation, the user-configured rules having at least one associated action, wherein the at least one associated action comprises one or more of adding the source IP address to the honeypot-drop chain, dropping packets, and sending alerts to a user;

then, if the packet was not routed or dropped, evaluating the incoming packet with a list chain to determine whether the source IP address matches an active country or global network list, wherein the list chain stores user-configured rules to route or drop packets based on the source country, region, or online entity that is deduced from the header information by the rules engine using pre-compiled lists retrieved from the server, the user-configured rules can further specify additional packet header information such as TCP or UDP ports;

then, if the packet was not routed or dropped, evaluating the incoming packet with an out-list chain to determine whether the destination IP matches an active country or global network list, wherein the out-list chain stores user-configured rules to route or drop packets based on the destination country, region, or online entity that is deduced from the header information by the rules engine using pre-compiled lists retrieved from the server, wherein the user-configured rules can further specify additional packet header information comprising TCP or UDP ports, wherein the rules engine compares the destination IP address and destination port of the packet with IP addresses in the out-list chain and, in the case of a match, routes or drops the packets depending on the rules; and then logging IP header information and country, region and online entity information of the packet for future use.

9. The method of claim 8, further comprising providing a user interface to facilitate configuration to route or drop specific kinds of traffic.

10. The method of claim 9, wherein the user interface comprises a real-time display of actionable logs, the logs comprising at least one of source and destination geographic information, Global Network List matching information, IP ownership information, and standard IP header data, from a table in memory.

11. The method of claim 9, further comprising performing a net check on an IP address or hostname, the net check providing the user with additional information about an IP address or hostname.

12. The system of claim 1, wherein the appliance periodically queries the server for pre-compiled list updates, the pre-compiled list updates having been specifically compiled on the server to combine contiguous network blocks assigned to a specific country, region, or online entity, when the pre-compiled list is retrieved from the server by the appliance, the list is loaded into a temporary location in memory and then swapped with the section of memory in use by the rules engine to make the updates active to the rules engine.

13. The system of claim 1, wherein the appliance is configured to obtain additional information about an IP address or hostname, including detailed IP location information, IP reputation, reverse DNS host and domain name information, and WHOIS information, by querying the appliance's database and requesting information from the server, whereby:

- the database is first queried for cached data, if some or all data is not retrieved from the database then the server is queried for the remaining data, if some of the data is not available from the server, then the appliance queries public repositories on the Internet for the information;
- all netcheck data is then stored in the database as cached data;
- any information found in public repositories on the Internet is sent to the server to be cached for other appliances; and
- all netcheck details are displayed to the user as soon as they are available to the appliance.

14. The system of claim 4, wherein the trigger rules comprise at least a network traffic flow rate limitation and the at least one associated action comprises at least dropping packets, wherein the packets are only dropped if the network traffic flow rate is greater than a user-configured flow-rate limitation.

15. The method of claim 8, wherein the trigger rules comprise at least a network traffic flow rate limitation and the at least one associated action comprises at least dropping packets, wherein the packets are only dropped if the network traffic flow rate is greater than a user-configured flow-rate limitation.

* * * * *